(12) United States Patent
Mann

(10) Patent No.: US 10,653,125 B2
(45) Date of Patent: May 19, 2020

(54) ICE FISHING APPARATUS

(71) Applicant: Doyle D Mann, Gladwin, MI (US)

(72) Inventor: Doyle D Mann, Gladwin, MI (US)

(*) Notice: Subject to any disclaimer, the term of this patent is extended or adjusted under 35 U.S.C. 154(b) by 183 days.

(21) Appl. No.: 16/002,076

(22) Filed: Jun. 7, 2018

(65) Prior Publication Data

US 2019/0373877 A1    Dec. 12, 2019

(51) Int. Cl.
| | |
|---|---|
| *A01K 97/01* | (2006.01) |
| *A01K 97/12* | (2006.01) |
| *A01K 97/10* | (2006.01) |
| *A01K 91/06* | (2006.01) |

(52) U.S. Cl.
CPC .............. *A01K 97/01* (2013.01); *A01K 97/10* (2013.01); *A01K 97/12* (2013.01); *A01K 91/065* (2013.01)

(58) Field of Classification Search
CPC ....... A01K 97/01; A01K 97/12; A01K 91/065
USPC .............................................................. 43/16
See application file for complete search history.

(56) References Cited

U.S. PATENT DOCUMENTS

| | | | | |
|---|---|---|---|---|
| 4,083,139 A | * | 4/1978 | Schwend | A01K 97/01 43/16 |
| 4,373,287 A | * | 2/1983 | Grahl | A01K 97/01 43/17 |
| 4,941,278 A | | 7/1990 | Verkuil | |
| 4,993,181 A | * | 2/1991 | Cooper | A01K 97/01 43/15 |
| 5,050,333 A | * | 9/1991 | Debreczeni | A01K 97/01 43/15 |
| 5,235,773 A | * | 8/1993 | Rinehart | A01K 97/01 43/17 |
| 5,564,213 A | * | 10/1996 | Rinehart | A01K 97/01 43/17 |
| 5,987,801 A | | 11/1999 | Anderson | |
| 6,021,596 A | | 2/2000 | Heuke | |
| 6,594,941 B1 | | 7/2003 | Anderson | |
| 6,817,136 B2 | | 11/2004 | Novak | |
| 7,062,877 B1 | | 6/2006 | Koch, III | |
| 7,210,263 B2 | | 5/2007 | Franke | |
| 8,453,371 B1 | | 6/2013 | Sullivan | |
| 8,978,288 B2 | | 3/2015 | Olson | |
| 9,137,978 B1 | | 9/2015 | Sullivan | |
| 9,894,891 B2 | | 2/2018 | Bryzek | |
| 2009/0139130 A1 | * | 6/2009 | Nozzarella | A01K 97/01 43/17 |
| 2014/0068995 A1 | * | 3/2014 | Galbraith | A01K 97/12 43/17 |
| 2014/0137460 A1 | * | 5/2014 | Weber | A01K 97/12 43/21.2 |
| 2017/0265446 A1 | * | 9/2017 | Dungan | A01K 97/01 |

FOREIGN PATENT DOCUMENTS

| | | | | |
|---|---|---|---|---|
| CA | 2379911 A1 | * | 9/2002 | ............ A01K 97/01 |
| CA | 2810890 A1 | * | 9/2013 | ............ A01K 97/10 |
| CA | 2933355 A1 | * | 12/2016 | ............ A01K 97/01 |

\* cited by examiner

*Primary Examiner* — Christopher P Ellis

(57) ABSTRACT

An ice fishing apparatus for allowing the use of the natural wind to operate, the ice fishing apparatus comprised mainly of a base, a spring action bar, a flat cross bar, a spring-loaded signal flag, an air foil, a rod holder and a trigger mechanism.

14 Claims, 6 Drawing Sheets

US 10,653,125 B2

ICE FISHING APPARATUS

BACKGROUND OF THE INVENTION

The applicant is aware of the following prior art. In U.S. Pat. No. 6,021,596 entitled, "Wind driven Jigging Device on a Bucket", issued to Heuke on Feb. 8, 2000, discloses a wind driven jigging device for ice and dock fishing with a jigging rod mounted on a bucket that uses wind gusts to oscillate a jigger rod.

In U.S. Pat. No. 6,817,136 entitled, "Fishing Pole Holding and Wing Jigging Device", issued to Novak on Nov. 16, 2004, there is disclosed a jigging device for fishing poles which provide for easy assembly of the device upon a fishing strike.

U.S. Pat. No. 9,894,891 entitled, "Strike Indicator Fishing System", issued to Bryzek on Feb. 20, 2018, discloses a strike indicator fishing system comprising a means of visual notification of a fish strike that is easy to set up using a magnet line securing means.

U.S. Pat. No. 7,062,877 entitled, "Fishing Tip-up" issued to Koch III on Jun. 20, 2006 discloses an ice fishing device that is completely self-contained, collapsible and its jigging action is completely wind driven.

U.S. Pat. No. 6,594,941 entitled, "Fishing Rod Holder Tip-up Device", issued to Anderson on Jul. 22, 2003, discloses a folding frame apparatus that contains a removable and pivoting rod clamp employed to hold a ice fishing rod in the desired position, and is designed in a manner that it can be used with almost all of the ice fishing jig rods on the market today.

In U.S. Pat. No. 5,987,801 entitled, "Fishing Rod Holder Tip-up", issued to Anderson on Nov. 23, 1999 there is disclosed a folding frame apparatus that contains a removable and pivoting rod clamp employed to hold an ice fishing jig rod in the desired position, and is designed in a manner that it can be used with almost all of the ice fishing jig rods on the market today.

In U.S. Pat. No. 8,453,371 entitled, "Powered Jigging Device for Fishing", issued to Sullivan on Jun. 4, 2013, there is disclosed a powered jigging device for fishing that includes a base section secured to an upright support section. A pole holder assembly pivotally attached to the upright support section includes a plate portion parallel to the upright support section and pivotally attached at a pivot point thereto, and a pole attachment portion secured to the plate portion above the pivot point thereof.

U.S. Pat. No. 9,137,978 entitled, "Universal Tipping Rod Holder for Ice Fishing", issued to Sullivan on Sep. 22, 2015, discloses a tipping rod and reel holder member slidably secured thereto. The rod and reel holder member includes a closed, linear, fulcrum slot with a fastener to fasten it to the upright support.

U.S. Pat. No. 4,941,278 entitled, Vertical Fishing Tip-up" issued to Verkuil on Jul. 17, 1990, discloses a fishing device which is functional both to hook the fish and to signal the fisherman that the bait has been taken. A trigger mechanism is utilized to release a leaf spring which is connected to a fishing rod. Actuation of the trigger mechanism forces the fishing rod upwardly with sufficient force to hook the fish.

U.S. Pat. No. 7,210,263 entitled, "Rod Jigging Apparatus", issued to Franke on May 1, 2007, discloses a rod jigging apparatus for jigging one or more rods at the same time. The rod jigging apparatus includes a mounting member being designed for coupling to a support structure. An arm member selectively engages the mounting member whereby the arm member is designed for extending away from the support structure.

In U.S. Pat. No. 8,978,288, entitled, "Tip-up Ice Fishing Apparatus", issued to Olson on Mar. 17, 2015, there is disclosed a fishing strike indicator and retrieval apparatus comprising an upper unit with a fishing reel hook holder, a battery holder, a line guide, a light flag, a printed circuit board enclosure, and a detachable sliding mount that pivotally connects the upper unit to the lower unit.

THE INVENTION

The present invention is an ice fishing apparatus. The ice fishing apparatus comprises a base. This base has an upper surface and the upper surface is surmounted by a spring action bar. The spring action bar comprises a flat bar that has a length equal to or less than a width of the base. The spring action bar has a bottom surface. There are at least two springs independently attached to the bottom surface. The opposite end of these springs is attached to the base upper surface. There is a flat cross bar that is centered and surmounted on the spring action bar. The flat cross bar has a distal end, a near end, a top surface and an attachment point near a center point. The flat cross bar has an air foil at the distal end and a fishing rod holder at the distal end.

There is a spring attached signal flag and staff that has a distal end and is surmounted near the attachment point. There is a trigger mechanism at the near end consisting of a notch through the near end of the flat cross bar and a fork mounted in the notch.

The ice fishing apparatus wherein in another embodiment there is a predetermined weight, balanced weight mounted on a top surface of the flat cross bar.

In another embodiment the ice fishing apparatus is manufactured primarily from wood.

In another embodiment the ice fishing apparatus is manufactured primarily from plastic, primarily polyethylene, crosslinked polyethylene, and poly propylene.

In another embodiment the ice fishing apparatus is manufactured from metal, primarily ferrous metals, such as steel and non-ferrous metal such as aluminum.

In another embodiment the ice fishing apparatus rod holder is an L-shaped locking mechanism.

DETAILED DESCRIPTION OF THE DRAWINGS

Figure 1:
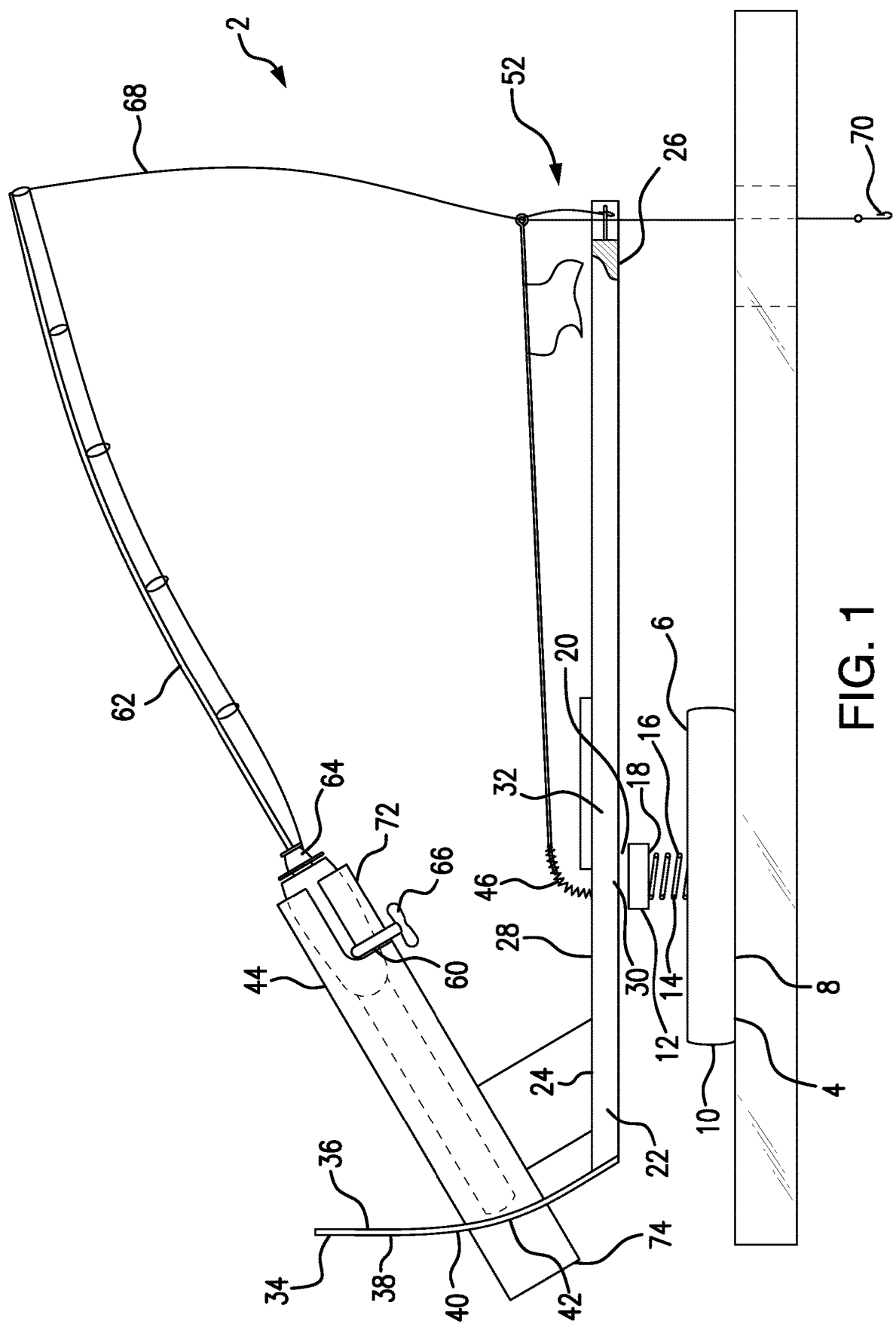
FIG. 1 is a full side view of the ice fishing apparatus holding a fishing rod.

FIG. 1 shows the ice fishing apparatus 2 from the side with a fishing rod 62. The ice fishing apparatus 2 is comprised of a base 4, spring action bar 12, a flat cross bar 22, a spring-loaded signal flag 46, an air foil 34, a rod holder 44 and a trigger mechanism 52.

The base 4 of the ice fishing apparatus 2 has an upper surface 6, a bottom surface 8 and an outer edge 10. The upper surface 6 of the base 4 has a spring action bar 12 surmounted on it. The spring action bar 12 is surmounted on the base 4 by a first spring 14 and a second spring 16. These springs 14 and 16 are surmounted on the upper surface 6 of the base 4 and the bottom surface 18 of the spring action bar 12.

The spring action bar 12 has a flat cross bar 22 surmounted on its upper surface 20 near a center point 32 at attachment point 30. The flat cross member 22 has a distal end 24, a near end 26 and a top surface 28.

The distal end 24 of the flat cross member 22 has an air foil 34 surmounted on it. This air foil 34 has a front surface 36, a back surface 38 and an outer edge 40. The air foil 34 also has an opening therethrough 42. Mounted within the opening therethrough 42 is a fishing rod holder 44.

The fishing rod holder 44 has a near end 72 and a distal end 74. The near end 72 of the fishing rod holder 44 has an L-shaped locking mechanism 60. The fishing rod 62 fits into the near end 72 of the fishing rod holder 44. The fishing reel 64 has a handle 66 that slides into the top of the L-shaped locking mechanism 60. When the handle 66 reaches the back of the L-shape of the L-shaped locking mechanism 60 it is moved down, locking the reel handle 66 and thus the reel 64, and the fishing rod 62 into place. The fishing rod 62 also has fishing line 68 on the reel 64 and a lure 70 on the line 68.

Figure 2:
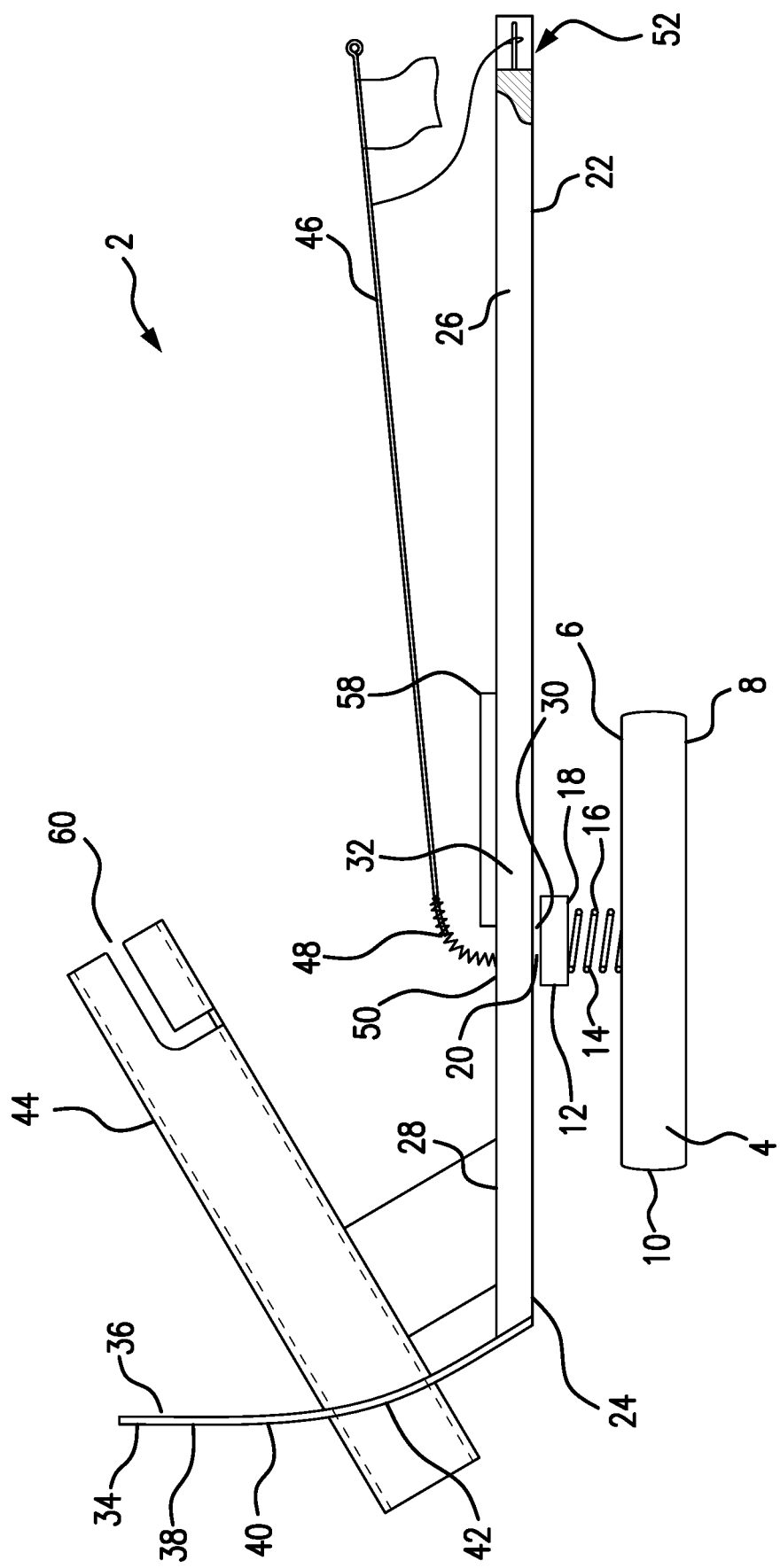
FIG. 2 is a full side view of the ice fishing apparatus without a fishing rod.

FIG. 2 shows the ice fishing apparatus 2 from the side without a fishing rod 62. The fishing apparatus 2 has a base 4, an upper surface 6 and a bottom surface 8. The bottom surface 8 rests on the ice. The upper surface 6 of the base 4 has a spring action bar 12 surmounted on it. The spring action bar 12 is surmounted on the base 4 by a first spring 14 and a second spring 16. These springs 14 and 16 are surmounted on the upper surface 6 of the base 4 and the bottom surface 18 of the spring action bar 12.

The spring action bar 12 has a flat cross bar 22 surmounted on its upper surface 20 at a center point 32 at attachment point 30. The flat cross member 22 has a distal end 24, a near end 26 and a top surface 28. Near the center point 32 is a balancing weight 58. It has been discovered that the placement of the balancing weight 58 allows the cross member 22 to return to its center point 32. The wind catches the air foil 34 to give the cross member 22 movement while the balancing weight 58 counteracts the air flow movement. The crossmember 22 sits on first spring 14 and second spring 16 which facilitates the rocking or jigging action of the device. This creates the up and down lure 70 motion.

The distal end 24 of the flat cross member 22 has an air foil 34 surmounted on it. This air foil 34 has a front surface 36, a back surface 38 and an outer edge 40. The air foil 34 also has an opening therethrough 42. Mounted within the opening therethrough 42 is a fishing rod holder 44.

The near end 26 of the cross member 22 has the trigger mechanism 52.

Figure 3:
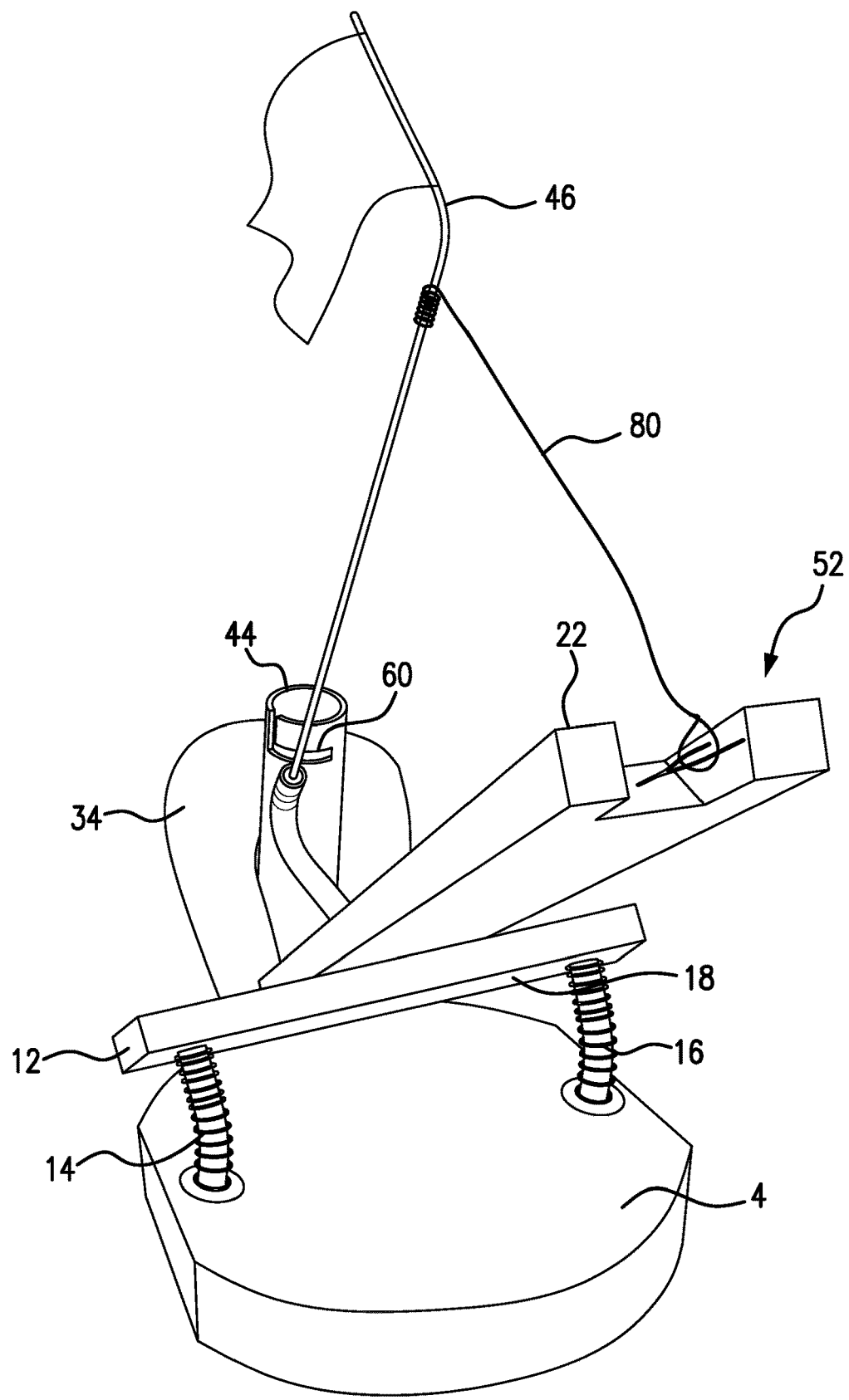
FIG. 3 is a full front view of the ice fishing apparatus.

FIG. 3 shows the ice fishing apparatus 2 from the front. The first spring 14 and second spring 16 are surmounted on base 4. The spring action bar 12 is surmounted on the first spring 14 and second spring 16. The flat cross bar 22 is surmounted on the spring action bar 12. The distal end 24 of the flat cross bar 22 has an air foil 34 with a rod holder 44 surmounted on it. The rod holder 44 has an L-shaped locking mechanism 60. The near end 26 of the flat cross bar 22 has the trigger mechanism 52. The trigger 80 of the triggering mechanism 52 is attached to the signal flag 46.

Figure 4:
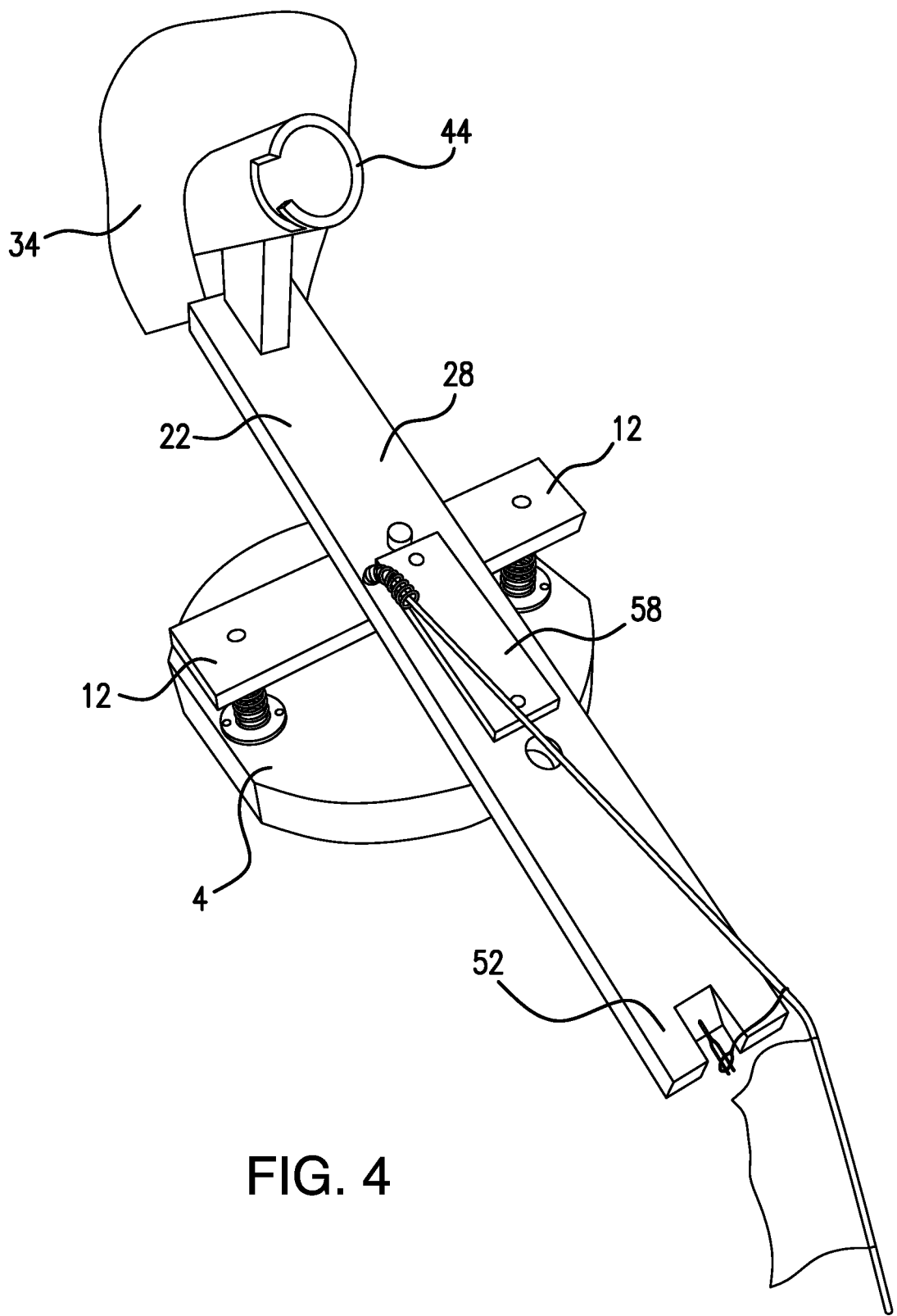
FIG. 4 is a full top view of the ice fishing apparatus.

FIG. 4 shows the ice fishing apparatus 2 from the top. The base 4 supports the first spring 14 and the second spring 16 supporting the spring action bar 12. The flat cross member 22 is connected to the spring action bar at a center point. The balancing weight 58 is mounted on the flat cross member 22 top surface 28. Also shown is the triggering mechanism 52.

Figure 5:
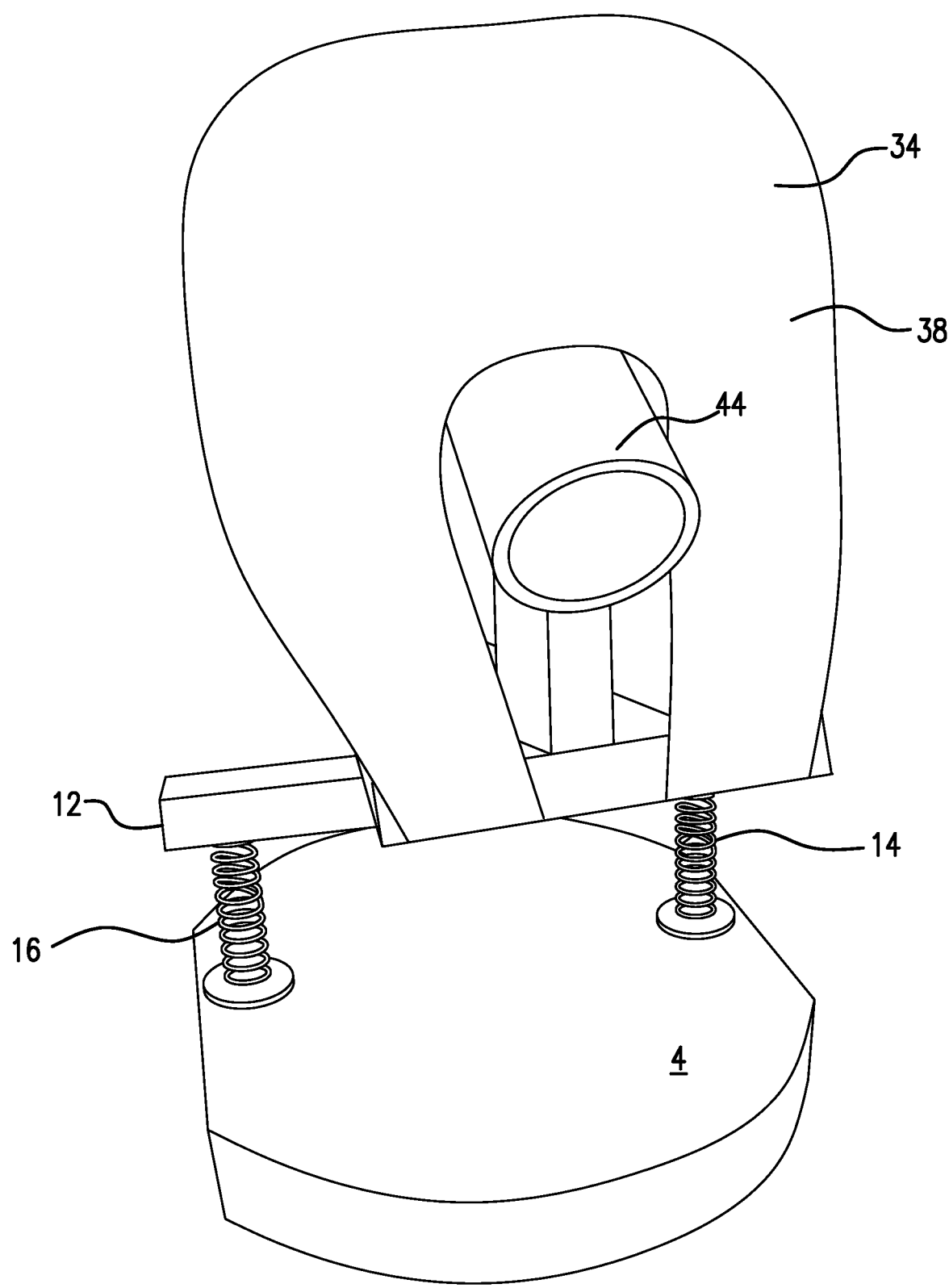
FIG. 5 is a full back view of the ice fishing apparatus.

FIG. 5 shows the ice fishing apparatus 2 from the rear. The rod holder 44 is visible through the opening 42 through the air foil 34.

Figure 6:
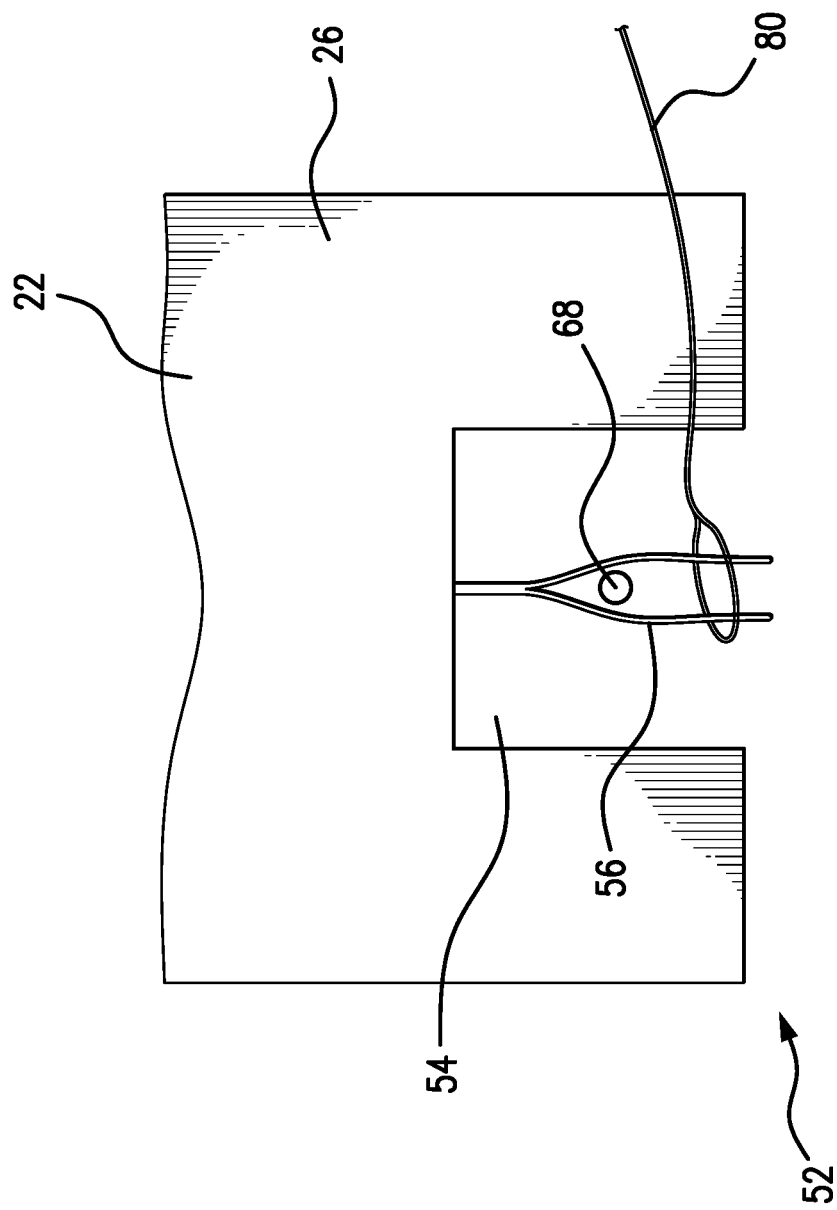
FIG. 6 is a full view of the trigger mechanism of the ice fishing apparatus of FIG. 1.

FIG. 6 shows the trigger mechanism 52 of the ice fishing apparatus 2. In the near end 26 of the flat cross member 22 is a notch 54 with a fork 56 mounted in it. The trigger 80 of the triggering mechanism 52 retains the fishing line 68 within the fork 56. Movement of the line moves the fishing line 68, moving the trigger 80 of the fork 56, releasing the signal flag 46, indicating a strike.

What is claimed is:

1. An ice fishing apparatus comprising:
   A. a base, said base having an upper surface and said upper surface being surmounted by a spring action bar, said spring action bar comprising a flat bar having a length equal to or less than a width of said base;
   B. said spring action bar having a bottom surface, there being at least two springs independently attached to said bottom surface, an opposite end of said springs being attached to said base upper surface;
   C. a flat cross bar being centered and surmounted on said spring action bar, said flat cross bar having a distal end, a near end, a top surface, and an attachment point near a center point;
   D. said flat cross bar having an air foil at said distal end and a fishing rod holder at said distal end;
   E. a spring attached signal flag and staff having a distal end, surmounted near said attachment point;
   F. a trigger mechanism at said near end consisting of a notch through the near end of said flat cross bar, a fork mounted in said notch.

2. The ice fishing apparatus as claimed in claim 1 wherein, in addition, there is a predetermined weight balancing weight mounted on a top surface of said flat cross bar.

3. The ice fishing apparatus as claimed in claim 1 wherein, in addition, the rod holder has an L-shaped locking mechanism.

4. The ice fishing apparatus as claimed in claim 1 manufactured primarily from wood.

5. The ice fishing apparatus as claimed in claim 1 manufactured primarily from plastic.

6. The ice fishing apparatus as claimed in claim 5 wherein the plastic is polyethylene.

7. The ice fishing apparatus as claimed in claim 5 wherein the plastic is crosslinked polyethylene.

8. The ice fishing apparatus as claimed in claim 5 wherein the plastic is poly propylene.

9. The ice fishing apparatus as claimed in claim 1 manufactured primarily from metal.

10. The ice fishing apparatus as claimed in claim 9 manufactured primarily from ferrous metal.

11. The ice fishing apparatus as claimed in claim 10 wherein the ferrous metal is steel.

12. The ice fishing apparatus as claimed in claim 1 manufactured primarily from non-ferrous metal.

13. The ice fishing apparatus as claimed in claim 12 wherein the metal is aluminum.

14. The ice fishing apparatus as claimed in claim 1 manufactured primarily from any combination of plastic, wood, and metal.

\* \* \* \* \*